United States Patent
Hessenberger (10) Patent No.: US 10,647,434 B2
(45) Date of Patent: May 12, 2020

(54) SEAT CUSHION FOR A VEHICLE SEAT, IN PARTICULAR AN AIRCRAFT SEAT

(71) Applicant: Greiner aerospace GmbH, Pettenbach (AT)

(72) Inventor: Norbert Karl Hessenberger, Ohlsdorf (AT)

(73) Assignee: Greiner aerospace GmbH, Pettenbach (AT)

( * ) Notice: Subject to any disclaimer, the term of this patent is extended or adjusted under 35 U.S.C. 154(b) by 7 days.

(21) Appl. No.: 16/078,842

(22) PCT Filed: Feb. 24, 2017

(86) PCT No.: PCT/EP2017/054330
§ 371 (c)(1),
(2) Date: Aug. 22, 2018

(87) PCT Pub. No.: WO2017/144662
PCT Pub. Date: Aug. 31, 2017

(65) Prior Publication Data
US 2019/0055023 A1    Feb. 21, 2019

(30) Foreign Application Priority Data

Feb. 26, 2016   (EP) .................................... 16157701

(51) Int. Cl.
*B32B 27/00*  (2006.01)
*B64D 11/06*  (2006.01)
*B60N 2/70*  (2006.01)

(52) U.S. Cl.
CPC ............ *B64D 11/0647* (2014.12); *B60N 2/70* (2013.01); *B64D 11/0649* (2014.12); *B64D 11/0648* (2014.12)

(58) Field of Classification Search
CPC .............. A47C 7/20; A47C 7/18; A47C 27/16
See application file for complete search history.

(56) References Cited

U.S. PATENT DOCUMENTS

| | | | |
|---|---|---|---|
| 3,259,435 A | 7/1966 | Jordan, Jr. et al. | |
| 3,389,935 A | 6/1968 | Getz et al. | |
| 4,916,765 A * | 4/1990 | Castronovo, Jr. .... | A47G 9/1081 297/284.1 |
| 5,053,148 A | 10/1991 | von Bonin | |
| 5,388,296 A * | 2/1995 | Mansour .............. | A47C 21/046 5/484 |
| 5,533,218 A * | 7/1996 | Fahy .................... | A47C 27/144 5/421 |
| 5,669,799 A | 9/1997 | Moeseneder et al. | |

(Continued)

FOREIGN PATENT DOCUMENTS

| | | |
|---|---|---|
| DE | 3912552 A1 | 10/1990 |
| DE | 60200057 T2 | 7/2004 |

(Continued)

*Primary Examiner* — Shin H Kim
(74) *Attorney, Agent, or Firm* — The Webb Law Firm (57) ABSTRACT

Provided is a seat cushion for at least one vehicle seat, in particular an aircraft seat, including at least one bolster including at least one layer made of a plastic material. In the at least one plastic material layer at least one stabilizing means is embedded. The at least one stabilizing means has a bending stiffness which is higher with respect to the plastic material layer.

19 Claims, 9 Drawing Sheets

(56) References Cited

U.S. PATENT DOCUMENTS

| | | | |
|---|---|---|---|
| 6,037,032 | A | 3/2000 | Klett et al. |
| 6,823,546 | B1 * | 11/2004 | Hsu ................... A47G 9/007 5/636 |
| 8,782,835 | B2 | 7/2014 | Pozzi |
| 2002/0098753 | A1 | 7/2002 | Latham et al. |
| 2002/0109379 | A1 | 8/2002 | Marechal et al. |
| 2013/0247303 | A1 | 9/2013 | Pozzi |
| 2014/0239678 | A1 | 8/2014 | Todd |

FOREIGN PATENT DOCUMENTS

| | | |
|---|---|---|
| DE | 102013006145 A1 | 10/2014 |
| EP | 0609715 A1 | 8/1994 |
| EP | 1165457 A1 | 1/2002 |
| GB | 2480609 A | 5/2010 |
| WO | 9964223 A1 | 12/1999 |
| WO | 2013096985 A2 | 7/2013 |

* cited by examiner

SEAT CUSHION FOR A VEHICLE SEAT, IN PARTICULAR AN AIRCRAFT SEAT

CROSS-REFERENCE TO RELATED APPLICATIONS

This application is the United States national phase of International Application No. PCT/EP2017/054330 filed Feb. 24, 2017, and claims priority to European Patent Application No. 16157701.0 filed Feb. 26, 2016, the disclosures of which are hereby incorporated in their entirety by reference.

BACKGROUND OF THE INVENTION

Field of the Invention

The present invention relates to a seat cushion for at least one vehicle seat and to a vehicle seat comprising such a seat cushion.

Description of Related Art

Vehicle seats, in particular for airplanes, typically comprise a backrest along with seat elements with seat cushions, which are fixed on a suitable supporting structure.

Such seat cushions are manufactured from a bolster made of plastic material or natural materials, wherein the use of plastic foam is preferred for various reasons. In particular in air traffic, seat bolsters are glued together from various elastic flexible open-cell foams of different volumetric weights that are provided with flame retardants.

It likewise is known to manufacture vehicle upholstery from nonwovens or nonwoven fabrics, wherein layers of individual fibers or threads of plastic material are applied onto a carrier material and are connected with each other by needling or thermal stamping. Several layers of needle-punched nonwoven can be enveloped by a flame-resistant cover fabric. Between the cover fabric and the individual layers of needle-punched nonwoven, reinforcing mats made of metal or glass fibers can also be arranged to reduce damages.

From EP 609715 B1 there is known a vehicle seat having a bolster with a support body made of a plastic foam, wherein above and below the support body a plurality of layers made of further plastic materials are arranged, which are connected with each other. These further layers can be formed of high temperature-resistant fibers such as polypropylene or polyamide or aramide. These multi-layer bolsters are inserted into a suitable supporting structure and connected to the same.

The supporting structures for aircraft seats used in air traffic typically comprise a rigid frame made of metallic carriers or beams connected with each other, to which the seat elements and backrests each are attached in a suitable way.

SUMMARY OF THE INVENTION

It now is an object underlying the present invention to provide a seat cushion for a vehicle seat, such as for example for airplanes, which has a low total weight and at the same time a high mechanical stability and strength and also can easily be attached to the supporting structure for a group of seats or a vehicle seat.

This object is solved by a seat cushion with the features as described herein.

Correspondingly, there is provided a seat cushion for at least one vehicle seat, in particular an aircraft seat, comprising at least one bolster comprising at least one first layer made of a plastic material, wherein in the at least one first plastic material layer at least one stabilizing means is embedded, wherein the at least one stabilizing means has a bending stiffness which is higher with respect to the first plastic material layer.

The stabilizing means which in the present case is embedded or incorporated into the seat cushion is dimensionally more stable as compared to the plastic material of the bolster and has a high modulus of elasticity. Correspondingly, the stabilizing means provides the seat cushion with an increased mechanical stability and strength. Another advantage of the incorporated stabilizing means is its exchangeability, i.e. for example in the case of a damage of the stabilizing means it is possible to remove the damaged stabilizing means and replace it by a new part. In addition, with the present approach the stabilizing means can be examined or inspected for possible damages.

The characteristic values for seat cushions are determined by different hardness measurements or volumetric weight measurements. The cushion or bolster composition is divided into various classes: Light-weight, standard and comfort cushions with a weight tolerance of +/−10%, a hardness tolerance of +/−15%, a volumetric weight tolerance (molded foam) of +/−5%, and a volumetric weight tolerance (block foam) of +/−10%. The applied dynamic test criteria are as follows: When using upper-body restraining belts tensile loads are given in individual belts and should not be more than 1,750 lbs (7.78 kN). When dual belts are used for restraining the upper body, the total belt tensile load should not be more than 2,000 lbs (8.90 kN). The maximum pressure load between the pelvis and the lumbar spine should not be more than 1,500 lbs (6.67 kN).

The present seat cushion has a length a in a first direction of extension x and a width b in a second direction of extension y. In the mounted condition of the seat cushion, the direction of extension x represents the direction of extension extending in the longitudinal direction of the vehicle, in particular of the aircraft. The direction of extension y thus corresponds to the direction of extension which in the mounted condition of the seat cushion extends transversely to the longitudinal direction of the vehicle, in particular of the aircraft. The length a and width b of the seat cushion can be the same or different from each other, wherein a shape of the seat cushion with b>a is preferred.

In one embodiment of the present seat cushion, the at least one stabilizing means comprises elements spaced apart from each other or at least one flat element.

In one variant, the at least one stabilizing means can comprise tubes, in particular beams, spaced apart from each other. These tubes, preferably beams, preferably are not connected with each other or interconnected, but rather are individually arranged in the bolster.

In a particularly preferred variant, the at least one stabilizing means comprises at least 2, preferably 3, preferably 5-7 beams or tubes arranged parallel to each other.

The number and distance of the beams used as stabilizing means in particular are dependent on the width of the seat cushion. With a seat cushion width between 400 and 450 mm preferably up to 2 or 3 beams are used with a uniform distance of 100 to 120 mm to each other. With a seat cushion width of 410 mm and 3 beams, the beam distance can be 120 mm.

As material for the beams, there is preferably used a metal, such as for example aluminum, or also a suitable plastic material.

As particularly preferred materials fibers such as carbon fibers or glass fibers are provided. In this case it is provided in one variant to form the core material of the beams from unidirectionally aligned fibers. The surface material can be made of braided fibers. In any case, the fibers are incorporated into a resin system, such as into a phenol resin or epoxy resin.

The length l of the beams is selected in dependence on the distance of the carrier elements (described below) on which the seat cushion is fixed. Another factor influencing the beam length l is the seat cushion length a, wherein the beam length l preferably is smaller or less than the seat cushion length a. This prevents the beams from projecting or protruding from the seat cushion. The beam length l preferably lies in a range between 150 mm and 350 mm, preferably between 200 mm and 300 mm, in particular preferably between 250 mm and 280 mm.

The beams preferably are configured as circular cylinders, in particular as hollow cylinders. The outer diameter d of the beams can range between 10 and 20 mm, preferably between 12 and 16 mm, in particular preferably between 12 and 13 mm. In one beam variant, the wall thickness lies between 1 mm and 5 mm, preferably between 1.5 mm and 3 mm, in particular preferably between 1.5 mm and 2 mm.

The ends of the hollow cylinders both can each be open or be provided with a plug. It also is possible that only one end is open and the opposite end is provided with a plug. The plugs can have a length between 10 mm and 50 mm, preferably between 20 mm and 40 mm, in particular preferably between 25 and 35 mm. The plug length is dependent on the beam length and can be about 10-15% of the total length of the beams.

In another preferred embodiment the at least one stabilizing means comprises profiled carrier rails or carrier plates spaced apart from each other.

The number of the used carrier rails in turn is determined by the width of the seat cushion. In one variant, at least 2, preferably 3 carrier rails can be arranged in the seat cushion. The carrier rails can have a preferred center-to-center distance of 100 to 150 mm, in particular of 120 mm. The edge-to-edge distance preferably is 50 to 80 mm, preferably 60 to 65 mm. With a cushion width of 450 mm, the minimum distance (center-to-center) is 100 mm.

The carrier rails can be curved, wherein a U-profile or a trapezoidal profile is particularly preferred. The wall thickness of the rails lies between 0.5 mm and 5 mm, preferably between 1 and 4 mm, in particular preferably between 2 mm and 3 mm. The depth of the U-profile or trapezoidal profile lies in a range between 5 and 15 mm, preferably between 10 and 12 mm.

In a particularly preferred embodiment, at least one side end of the carrier rail profile is provided with a rounding, i.e. with a profile nose, in order to prevent the foam from being damaged by sharp edges. The profile rounding preferably is provided on the front side of the seat cushion (i.e. in the popliteal region), but can also be possible on both sides.

The carrier rails can be made of a light metal, such as for example aluminum, or also of a suitable plastic material. Fiber materials, such as carbon fibers or glass fibers, also were found to be particularly advantageous here. The fibers are incorporated into a resin system, such as into a phenol resin or epoxy resin. The profiling of the carrier rails can be effected e.g. by press stamping of fiber wet laminates or by the sheet molding compound (SMC) method.

In a particularly preferred embodiment, the carrier rails are provided with a flame-proofing material, in particular in the form of a flame-resistant fabric that is connected to the carrier rails in a suitable way.

A suitable fabric comprises e.g. high temperature-resistant fibers made of glass, plastic or graphite. Particularly preferred temperature-stable fibers include plastic fibers on the basis of polypropylene, polyacrylate or polyamides such as aramides or polybenzimidazole. The latter is particularly advantageous when the carrier rail itself already is made of a flame-resistant material, but otherwise a flame-resistant fabric can also be used.

In a preferred variant, the flame-resistant fabric consists of several layers of fire-resistant material and compressed textiles. For example, a first layer can consist of high temperature-stable fibers, a second (middle) layer of a prepreg fabric, and a third layer in turn of high temperature-stable fibers.

In another embodiment of the present seat cushion the at least one stabilizing means comprises a plurality of strips or bands spaced apart from each other. The number of the strips is dependent on the size of the seat cushion and the width of the strips, for example the stabilizing means can comprise to 2 to 20 strips, preferably 3 to 10 strips. The geometric arrangement of the strips in the bolster is comparable with the above-described arrangement of the beams in the bolster.

In a further variant, the strips used as stabilizing means are coupled with at least two struts extending parallel to each other, but vertically to the strips. In this case, the strips form a kind of slatted frame with the struts. The strips can be made of metal, wood-based material, plastic material, woven, knitted or braided fabric.

In another preferred embodiment, the flat stabilizing means comprises at least one flat element made of a woven fabric, braided fabric, knitted fabric, plastic material, metal or a wood-based material. The flat stabilizing means can be present in the form of a plate or consist of one or more layers of a woven fabric, braided fabric or knitted fabric. The size and dimensions of the flat stabilizing means are dependent on the dimensions of the seat cushion and are adapted correspondingly.

In the case of the above-described use of beams or rails as stabilizing means the same in one embodiment can be introduced and embedded into recesses provided in the bolster. In this case, at least 2, preferably 3, preferably 5-7 recesses extending parallel to each other are provided in concordance with the number of the beams or rails in the bolster.

In the mounted condition of the seat cushion, the beams of the stabilizing means and the recesses receiving the beams in the bolster of the seat cushion extend in longitudinal direction of the vehicle, in particular of the aircraft; i.e. the recesses are arranged in the above-defined direction of extension x of the seat cushion and preferably extend along the entire length a of the seat cushion. The beams as part of the stabilizing means thus likewise extend parallel to the direction of extension x and thus along the length a of the seat cushion.

The beams preferably are received in the recesses along their entire length. In other words, it is preferred that the beams are completely embedded into the recesses in the bolster, i.e. the beams are completely surrounded or enveloped by the bolster material. The recesses for the beams typically are incorporated into the plastic material of the bolster by means of contour cutting machines.

In a particularly preferred embodiment the recesses for the beams each are configured in the form of a a slot or gap broadening in the first material layer. The length of the slot or gap preferably corresponds to the length a of the seat cushion, i.e. the slot preferably extends along the entire length a of the seat cushion.

The depth of the slot or gap is adjusted such that it becomes possible to at least completely envelop or embed the beams in the bolster of the seat cushion. However, the depth of the slot is limited by the thickness of the bolster. The width of the slot or gap can be designed variable and will be as small as possible due to the preferred use of a flexible plastic foam as material for the bolster.

In one embodiment, the recesses for the beams each are configured in the form of a slot or gap with a circular broadening provided at the end of the slot or gap (e.g. the end that corresponds to the depth of the slot). Accordingly, the recess preferably is present in the form of a straight slot with a circular broadening provided at the end of the slot in the bolster, wherein the diameter of the circular broadening is greater than the width of the slot.

The circular broadening of the recess is formed with a nose and a latching in the transition region between slot and circular broadening. Thus, it becomes possible to envelop and anchor the received beams in the bolster. The nose provides for an easy introduction or insertion of the beam into the circular recess or broadening of the slot. The latching serves to lock the at least one beam into place or engage behind the same through the material of the bolster, and hence serves an anchorage (latching engagement) of the beam in the bolster, so that a positive connection is formed between beam and bolster of the seat cushion.

In use of carrier rails as stabilizing means, the same are inserted into suitable recesses in the (first) plastic material in analogy to the beams, so that a complete embedment of the rails into the plastic material is achieved.

It is also possible, however, to foam the beams (or also the carrier rails and further stabilizing means) directly into the molded foam.

The stabilizing means additionally can or also cannot be adhesively bonded to the plastic material of the seat cushion.

In another embodiment of the present seat cushion the plastic material layer comprising the at least one stabilizing means is coupled with at least one further plastic material layer.

The various plastic material layers can be connected to each other by using an adhesive. The adhesive forms a continuous adhesive layer and provides for a non-positive and positive connection of the at least two material layers.

It is also imaginable that the at least two plastic material layers of the bolster are connected with each other via at least one connecting means, in particular adhesive tapes or Velcro tapes. Such tapes can be present e.g. in the form of hook-and-loop tapes made of refractory material.

In a further embodiment of the present seat cushion the plastic material of the layers comprises a plastic foam, preferably made of polyurethane foam, polyethylene foam, polyether foam, polyester foam, silicone foam, or a plastic fabric, preferably made of polypropylene, polyethylene, polyacrylate.

When using several material layers (e.g. two or three) the same each can consist of the same material or of different materials. Preferably, the material layers each are formed in one part (in one piece), elastic, open-celled, and provided with a powdery flame retardant (for example melamine resin, aluminum hydroxide).

When using plastic foam as bolster material, further fiber materials, in particular high temperature-resistant fibers, can be embedded into the plastic foam.

On the upper side of the seat cushion (i.e. on the side of the seat cushion that serves as seating surface for the passenger) a cover fabric can be arranged, which is connected to the seat cushion by using a suitable fastening means such as an adhesive or hook-and-loop tape.

As explained above, the stabilizing means effects an increase of the stability and strength of the seat cushion. The present seat cushion reaches bending forces between 500 and 1750 N, preferably between 750 and 1550 N, and a bending strength between 50 and 450 $N/mm^2$, preferably between 100 and 250 $N/mm^2$. The bending stiffnesses lie between 10,000 and 120,000 $N/mm^2$, preferably between 10,000 and 50,000 $N/mm^2$.

It furthermore is preferred when the seat cushion is coupled with at least one carrier element as part of a supporting structure of the at least one vehicle seat. In particular, it is provided that the seat cushion is attached to the at least one carrier element by means of a fixing means in the form of adhesive tapes or Velcro tapes. It is also conceivable that the fixing means already are incorporated into the stabilizing means (by means of SMC or press stamping).

In one embodiment, the carrier element comprises at least two struts or beams arranged parallel to each other. In the mounted condition of the seat cushion and of the vehicle seat, the beams of the carrier element extend transversely to the longitudinal direction of the vehicle, in particular of the aircraft; i.e. the beams of the carrier element extend parallel to the direction of extension y and therefore parallel to the width b of the seat cushion.

The invention will be explained in detail below with reference to the Figures of the drawings, in which.

BRIEF DESCRIPTION OF THE DRAWINGS

DESCRIPTION OF THE INVENTION

Figure 1:
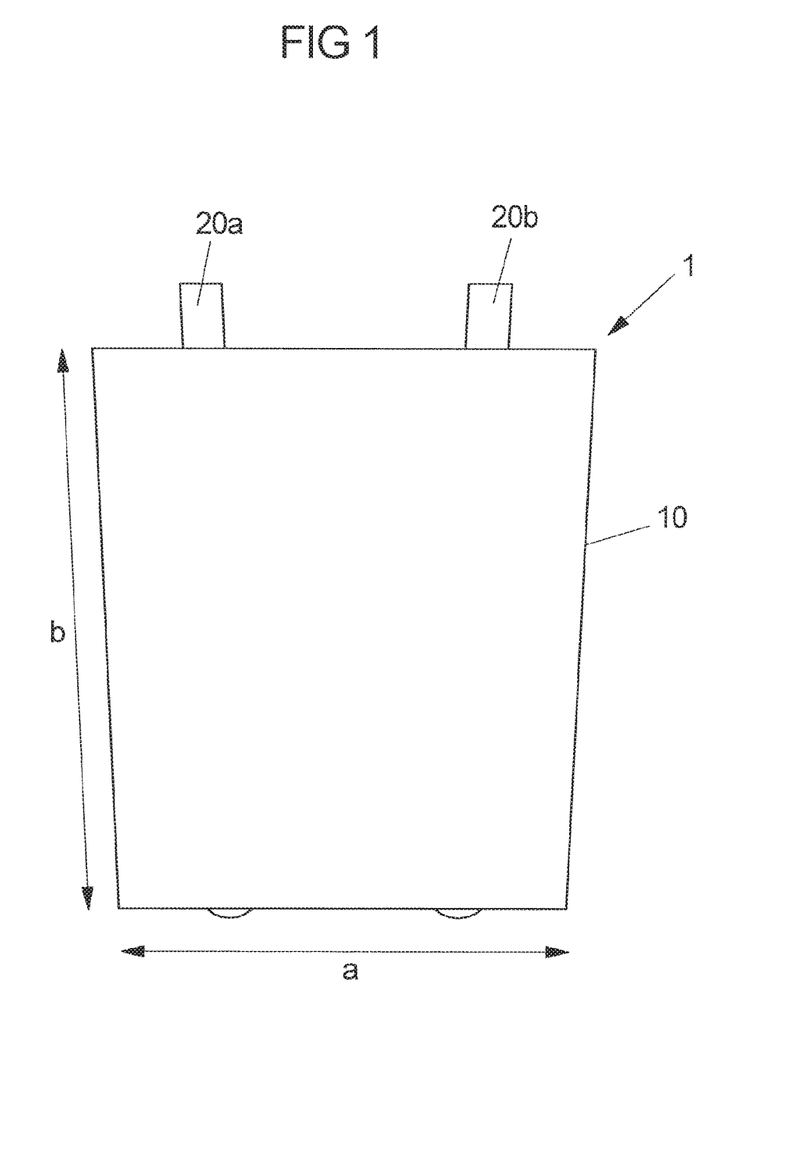
FIG. 1 shows a schematic view of a seat cushion.

The embodiment of the present seat cushion 1 for an aircraft seat as shown in FIG. 1 comprises a bolster 10 with a cover fabric, wherein the seat cushion is arranged on two beams or struts 20*a*, 20*b* as part of the supporting structure of the seat. The beams 20*a*, 20*b* as part of the supporting structure of the aircraft seat extend transversely to the aircraft longitudinal direction. The beams 20*a*, 20*b* in the present case are configured as hollow cylinders made of a metallic material (for example aluminum).

The bolster 10 of the seat cushion 1 serves as seating surface for an aircraft passenger and has roundings of the seating surface in the region in which the legs of the passenger rest on or against the seating surface.

The seat cushion 1 with the bolster 10 has a length a (in aircraft longitudinal direction) and a width b (transversely to the aircraft longitudinal direction). The formations of the seating surface of the seat cushion influence the seating comfort of the passenger.

FIGS. 2-7 show the individual structural features of embodiments of the present seat cushion.

Figure 2:
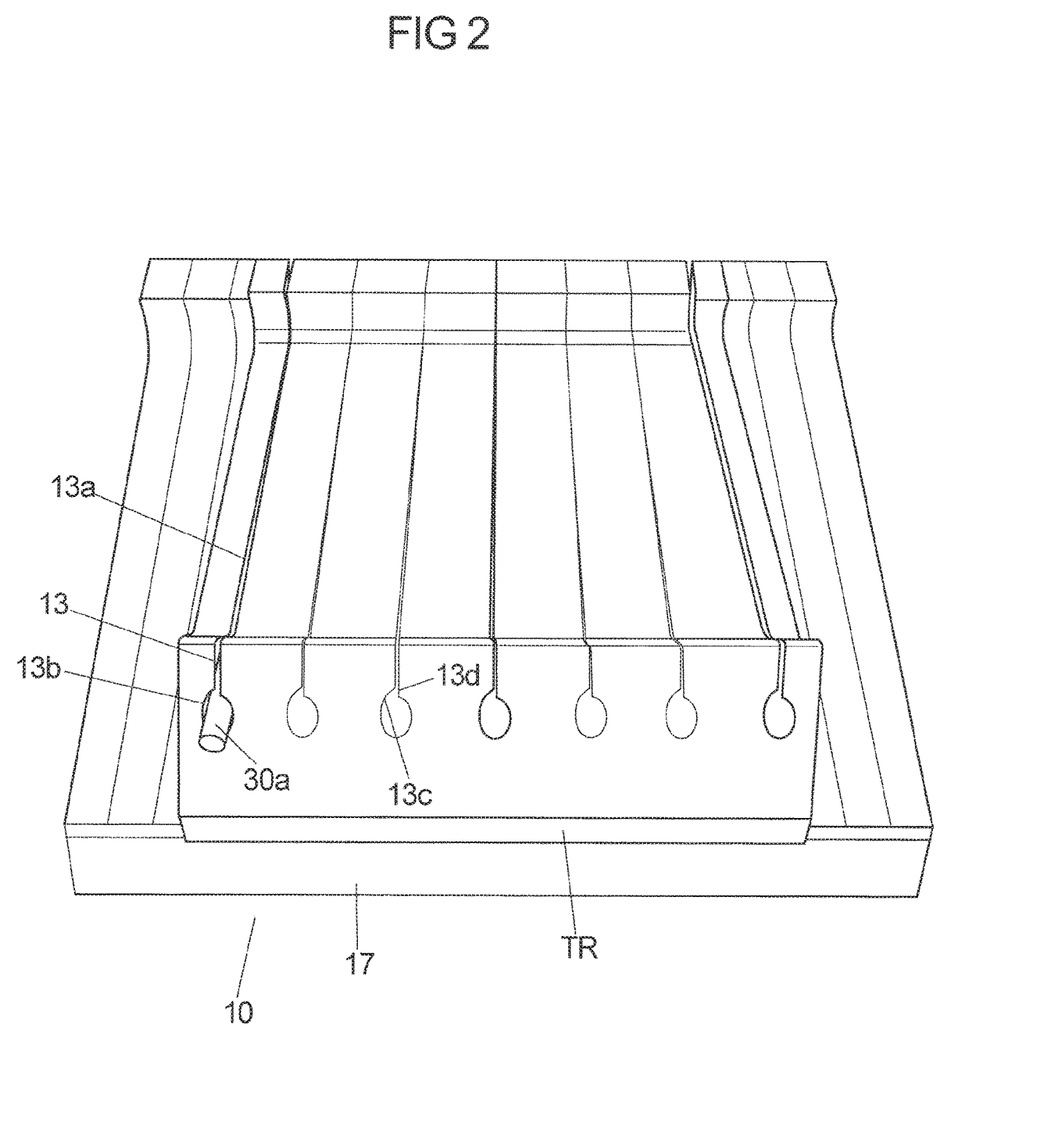
FIG. 2 shows a first schematic view of the underside of a first embodiment of the seat cushion.

The bolster 10 of the seat cushion 1 in a first embodiment (FIGS. 2-5) is shown in detail in FIG. 2 in a top view of the underside. The bolster 10 comprises a first material layer 11, which preferably consists of polyester foam or polyurethane foam (as molded foam), and a second material layer 12 coupled or connected with the first material layer 11, which for example consists of a polyurethane foam. The first material layer 11 and the second material layer 12 for example are connected by means of an adhesive layer.

In the first material layer 11 recesses 13 are provided for receiving beams 30a as stabilizing means (FIG. 2), wherein the number of the recesses is variable in dependence on the beams 30a to be received.

The recesses 13 are configured in the form of a slot or gap and extend parallel to the side a of the cushion 10 (i.e. in aircraft longitudinal direction), wherein in the present case the length of the recess is designed to be able to receive beams 30a as stabilizing means in their entire length.

The length of the recess 13 in the form of a slot approximately corresponds to the length a of the seat cushion or bolster 10. The recess 13 comprises a slot 13a and a circular broadening 13b. The dimensions of the slot and in particular of the circular broadening 13b are designed such that a complete embedment of a beam 30a can be effected; this means that the beam 30a completely is embedded into the plastic material of the first material layer or enclosed by the same.

In the transition region with the slot or with the gap 13a the circular broadening 13b is formed with a nose 13c and a latching or a rear grip 13d. The nose 13c provides for an easy introduction or insertion of the beam 30 of the first carrier element into the circular recess or broadening, while the rear grip 13d serves an anchorage of the beam 30a in the first material layer, so that a positive connection is formed between the beam 30a and the first material layer 11 of the bolster 10 of the seat cushion 1.

Figure 3:
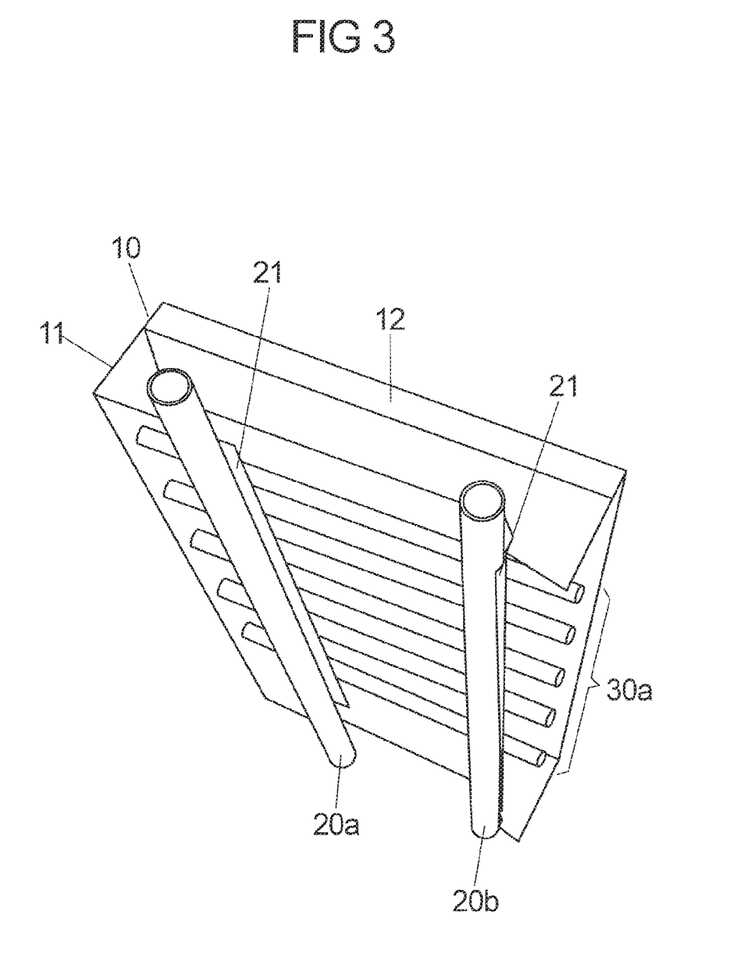
FIG. 3 shows a second schematic view of the underside of the embodiment of the seat cushion shown in FIG. 2.
Figure 4:
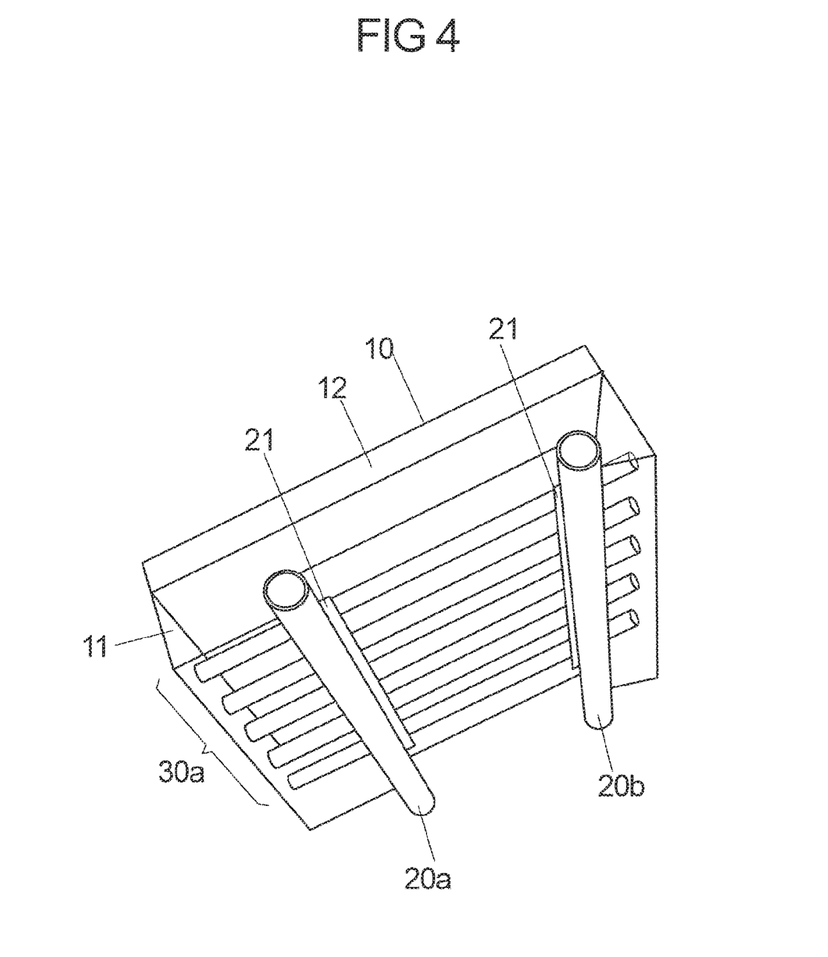
FIG. 4 shows a first schematic cross-sectional view of the embodiment of the seat cushion shown in FIG. 2.
Figure 5:
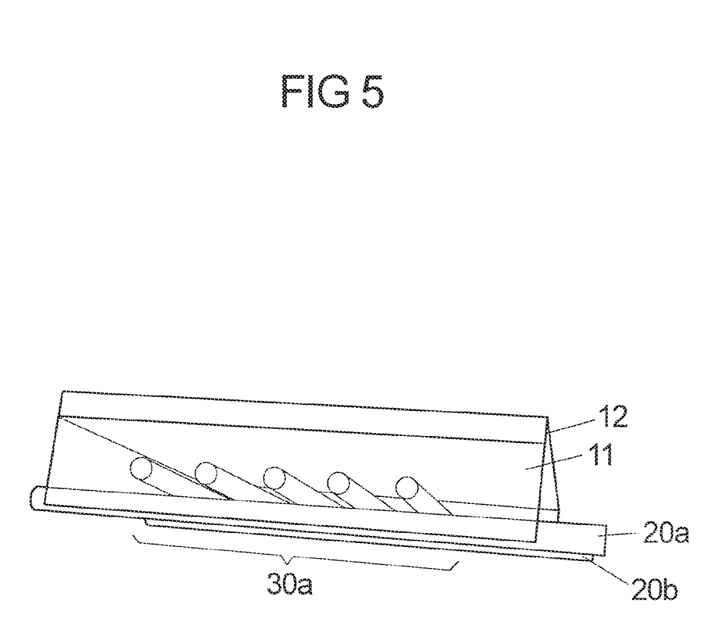
FIG. 5 shows a second schematic cross-sectional view of the embodiment of the seat cushion shown in FIG. 2.

For fixing or coupling the seat cushion 1 on the beams 20a, 20b as part of the supporting structure, the seat cushion 1 is attached to the beams 20a, 20b by means of suitable adhesive tapes 21 (see FIGS. 3 and 4).

Figure 6:
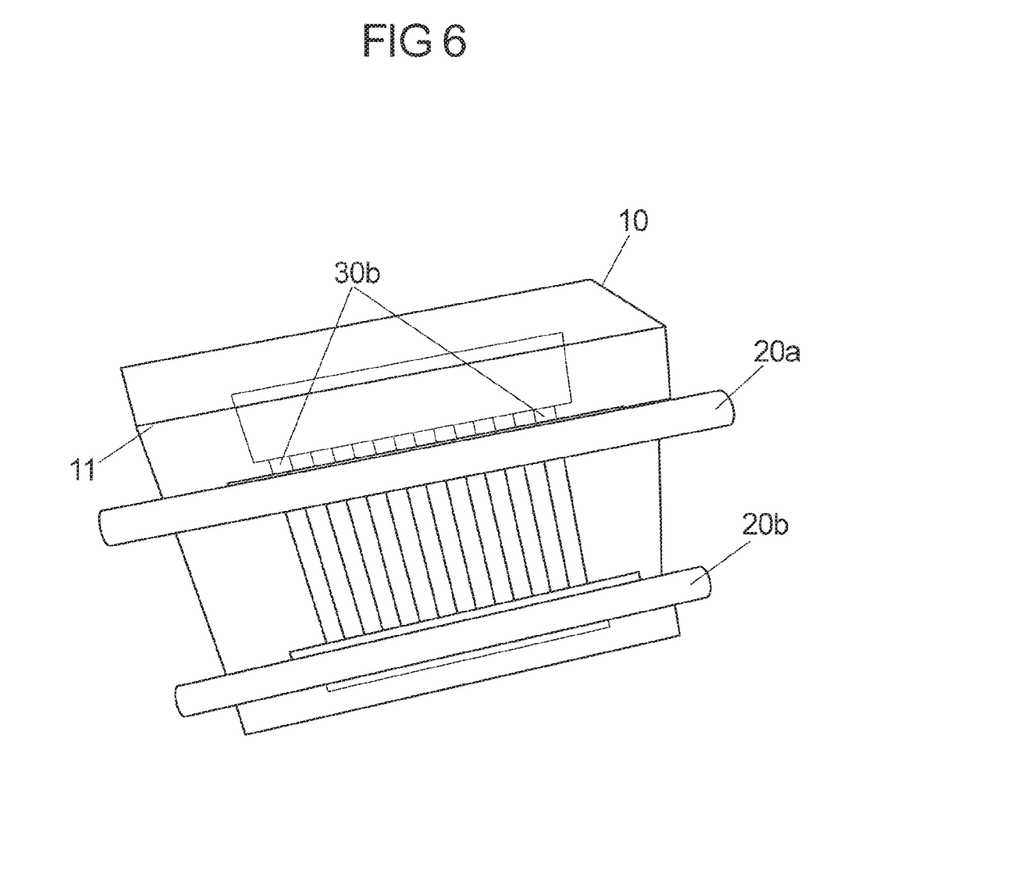
FIG. 6 shows a first schematic view of the underside of a second embodiment of the seat cushion.
Figure 7:
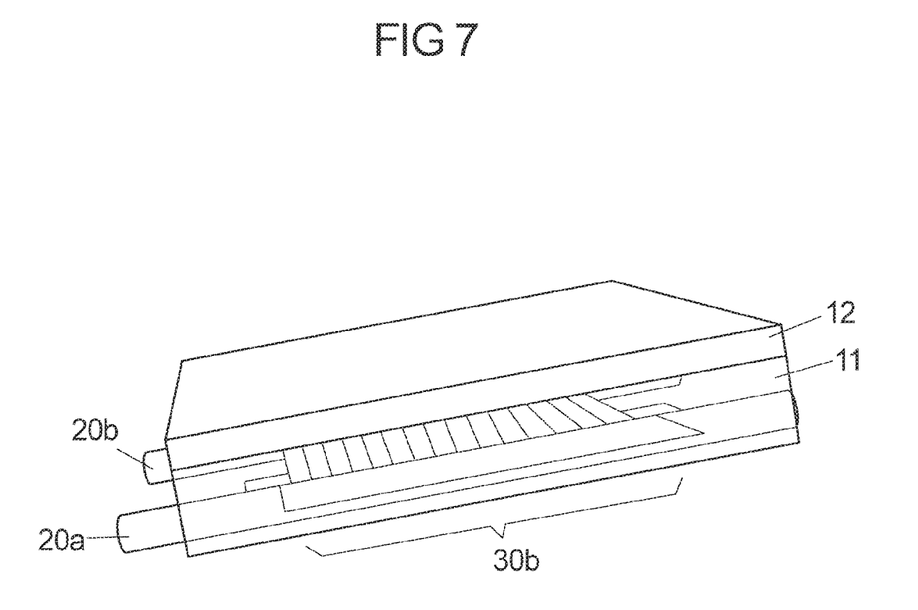
FIG. 7 shows a second schematic view of the underside of the embodiment of the seat cushion shown in FIG. 6.

In the second embodiment of the present seat cushion as shown in FIGS. 6 and 7, the stabilizing means consists of a plurality of spaced-apart strips 30b made of a fabric material. The number of the strips 30b is dependent on the size of the seat cushion and the width of the strips, for example the stabilizing means can comprise 5 to 20 strips, preferably 10 to 15 strips, in particular preferably 2 to 5 strips.

In the illustrated second embodiment, the strips 30b are connected with two struts extending vertically to the strips in the manner of a slatted frame (FIG. 7).

Figure 8A:
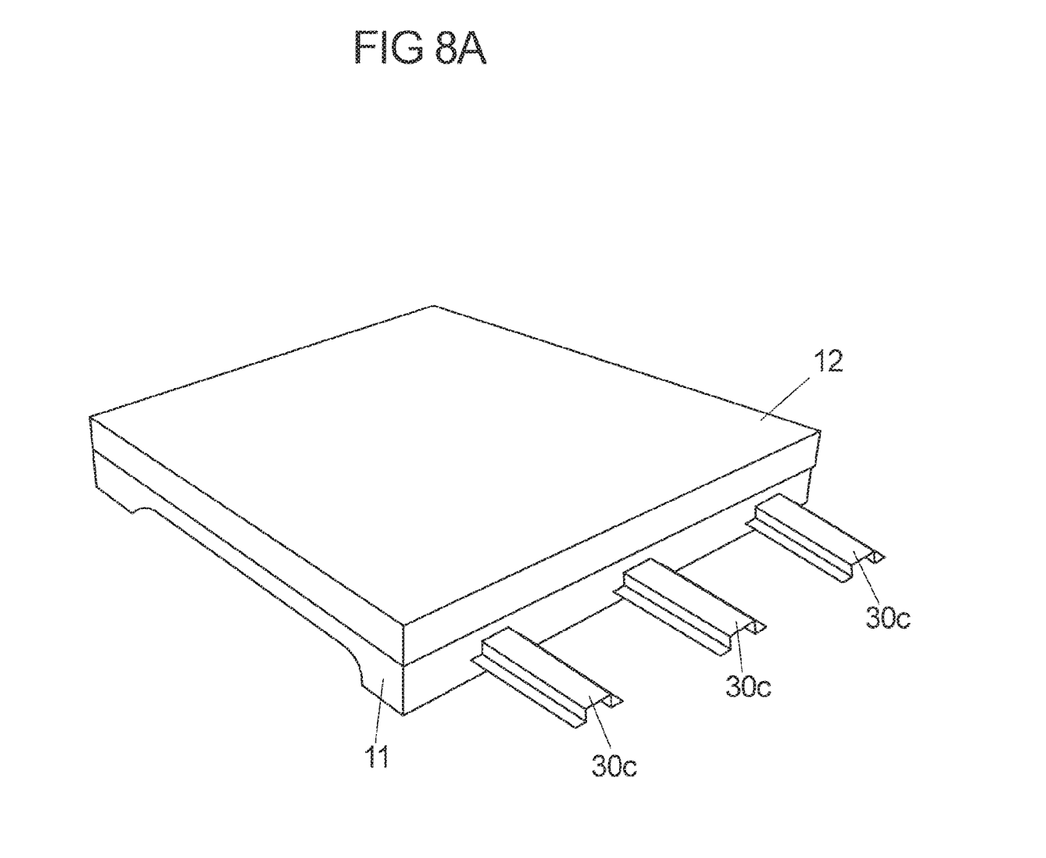
FIG. 8A shows a schematic view of a third embodiment of the seat cushion with carrier rails.
Figure 8B:
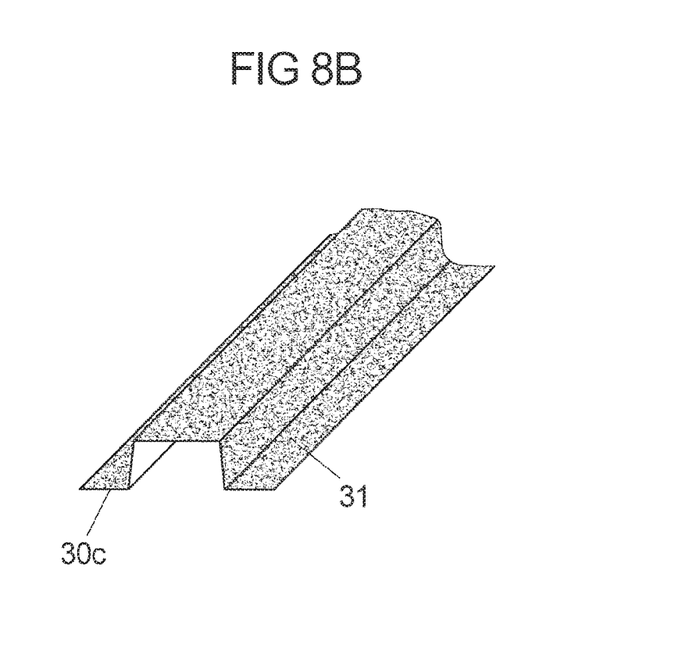
FIG. 8B shows a schematic cross-sectional view of a carrier rail.
Figure 8C:
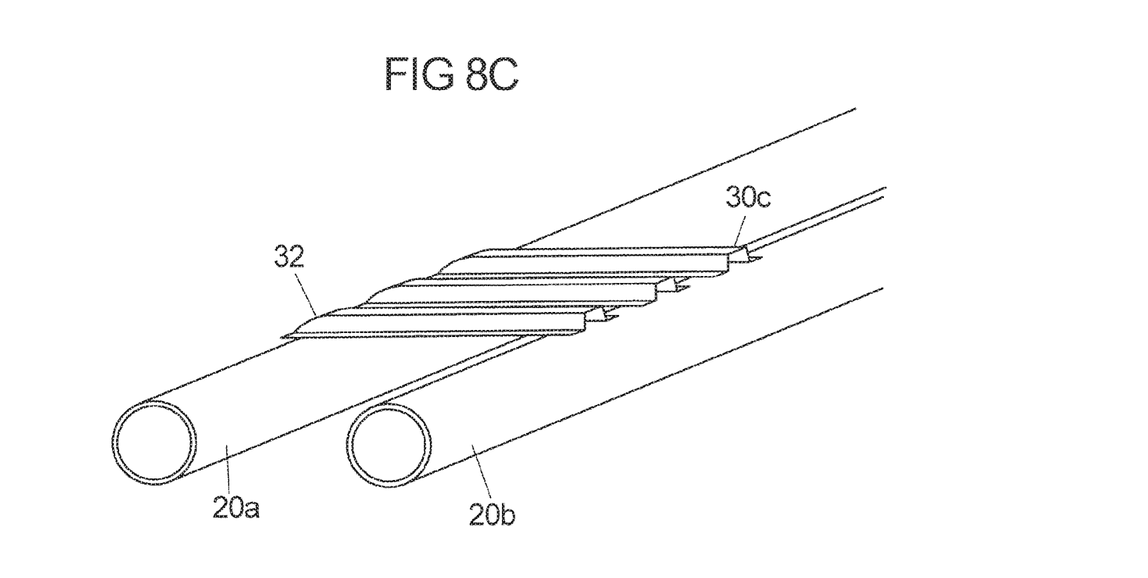
FIG. 8C shows a schematic view of carrier rails (without bolster) arranged on a supporting structure.

In the embodiments shown in FIGS. 8A-C, the stabilizing means is configured in the form of U-shaped carrier rails 30c.

The carrier rails 30c have a U-profile. The wall thickness of the carrier rails lies between 1.5 and 2 mm. The carrier rails 30c consist of carbon fibers or glass fibers. The fibers are incorporated into a resin system, such as into a phenol resin or epoxy resin. The profiling of the carrier rails can be effected e.g. by press stamping of fiber wet laminates or by means of the sheet molding compound (SMC) method.

The carrier rails 30c either are made of a flame-resistant material or additionally are provided with a flame-proofing material in the form of a flame-resistant fabric 31 made of temperature-stable fibers, i.e. plastic fibers on the basis of polypropylene, polyacrylate or polyamides such as aramides or polybenzimidazole. For this purpose, the carrier rails 30c can be laminated with the flame-resistant fabric 31 (see FIG. 8B).

In the embodiment shown in FIG. 8A three carrier rails are shown in parallel with a center-to-center distance of 100 mm in a seat cushion (with a width of 450 mm). The carrier rails 30c have a U-profile or a trapezoidal profile. The depth of the U-profile or trapezoidal profile lies in a range between 10 and 12 mm.

A side end of the carrier rails 30c is provided with a rounding 32 as profile nose in order to prevent the foam from being damaged by sharp edges. The profile rounding 32 preferably is provided on the front side of the seat cushion (i.e. in the popliteal region), but can also be possible on both sides (FIG. 8C, for simplification shown without bolster).

The invention claimed is:

1. A seat cushion for at least one vehicle seat comprising at least one bolster comprising at least one first layer made of a plastic material,
    wherein in the at least one first plastic material layer at least one stabilizing means is embedded, wherein the at least one stabilizing means has a higher bending stiffness with respect to the first plastic material layer and the at least one stabilizing means comprises profiled carrier rails spaced apart from each other.

2. The seat cushion according to claim 1, wherein the at least one stabilizing means comprises spaced-apart elements or at least one flat element.

3. The seat cushion according to claim 1, wherein the at least one stabilizing means comprises spaced-apart tubes.

4. The seat cushion according to claim 3, wherein the at least one stabilizing means comprises at least two tubes arranged parallel to each other.

5. The seat cushion according to claim 1, wherein the at least one stabilizing means comprises a plurality of strips or bands spaced apart from each other.

6. The seat cushion according to claim 5, wherein the strips are coupled with at least two struts extending parallel to each other, but vertically to the strips.

7. The seat cushion according to claim 1, wherein at least two carrier rails are arranged parallel to each other.

8. The seat cushion according to claim 1, wherein the carrier rails consist of fiber materials.

9. The seat cushion according to claim 1, wherein the carrier rails are provided with a flame-proofing material.

10. The seat cushion according to claim 1, wherein the at least one stabilizing means comprises at least one flat element made of a woven fabric, braided fabric, knitted fabric, plastic material, metal or a wood-based material.

11. The seat cushion according to claim 1, wherein the first plastic material layer comprising the at least one stabilizing means is coupled with at least one further second plastic material layer.

12. The seat cushion according to claim 11, wherein plastic material layers are connected with each other by using an adhesive.

13. The seat cushion according to claim 11, wherein the plastic material layers are connected with each other via at least one connecting means.

14. The seat cushion according to claim 1, wherein the plastic material of the layers comprises a plastic foam or a plastic fabric.

15. The seat cushion according to claim 14, wherein into the plastic foam further fiber materials are embedded.

16. The seat cushion according to claim 1, wherein the bolster is coupled with at least one carrier element as part of a supporting structure of the at least one vehicle seat.

17. The seat cushion according to claim 16, wherein the bolster is attached to the at least one carrier element by means of a fixing means.

18. A vehicle seat comprising at least one seat cushion according to claim 1.

19. The vehicle seat of claim 18, wherein the vehicle seat is an aircraft seat.

\* \* \* \* \*